(121.)

BENJAMIN W. HEALEY.

Improvement in Iron Tender Frame

No. 4,661. Reissued Dec. 5, 1871.

WITNESSES:

Peter T. Hughes

A. J. Leuching

INVENTOR

Benjamin W. Healey

UNITED STATES PATENT OFFICE.

BENJAMIN W. HEALEY, OF PROVIDENCE, RHODE ISLAND.

IMPROVEMENT IN IRON TENDER-FRAMES.

Specification forming part of Letters Patent No. 103,878, dated June 7, 1870; reissue No. 4,661, dated December 5, 1871.

*To all whom it may concern:*

Be it known that I, BENJAMIN W. HEALEY, of Providence, in the county of Providence and State of Rhode Island, have invented a new and useful Improvement in Iron Tender or Car Frame; and I do hereby declare that the following is a full, clear, and exact description thereof, which will enable others skilled in the art to make and use the same, reference being had to the accompanying drawing forming part of this specification.

Figure 1:
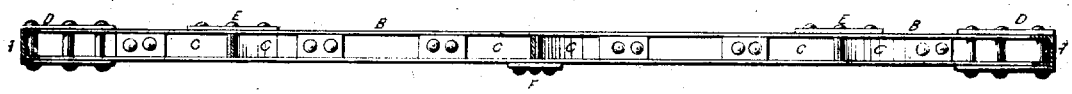
Figure 2:
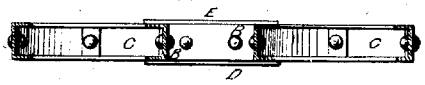
Figure 3:
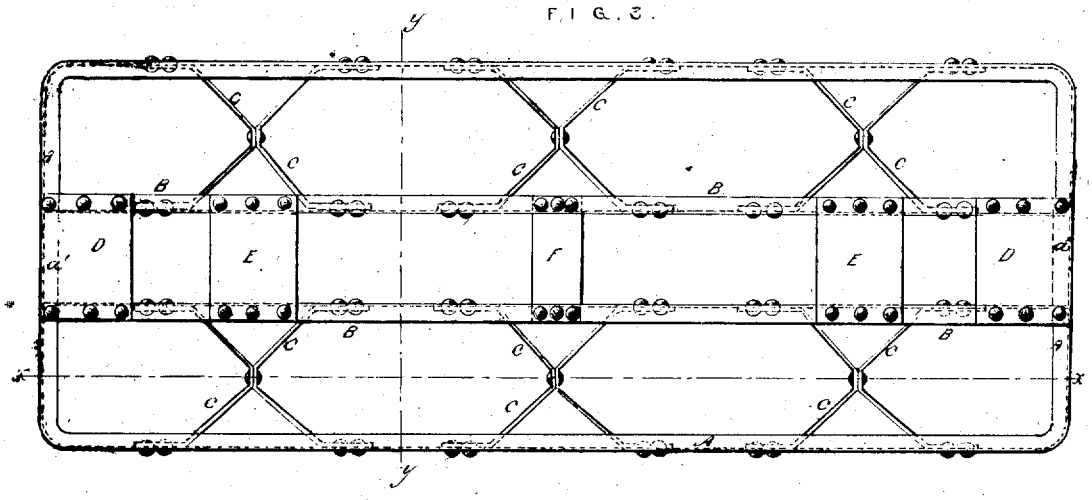

Figure 1 is a vertical longitudinal section of my improved frame taken through the line *x x*, Fig. 3. Fig. 2 is a vertical cross-section of the same taken through the line *y y*, Fig. 3. Fig. 3 is a plan or top view of the same.

Similar letters of reference indicate corresponding parts.

The frame of tenders for locomotives and for various kinds of railway cars have before my invention been constructed of iron. Such frames have, however, heretofore been invariably made from boiler-plate iron, and made up of two strips placed parallel with each other, and united by means of rivets at one of their edges to a third strip placed at right angles to both the others, the edges of the third strip being turned over to form flanges to hold the rivets which unite it to the other two plates. Iron beams and girders used in architectural work have been and are constructed in the way to which I refer. The amount of labor required to make a frame from bars so made up is necessarily very great, and the cost of construction from this fact and from the weight of metal required to give the frame sufficient strength is proportionately large. My invention resides in the employment, for the main beams of such frames, of iron which has been rolled into the form of hollow bars of three sides, two of which are parallel, and which description of bar is commonly known as "channel-iron," whereby I am enabled to produce a frame with much less weight of metal, get rid of the labor and expense incident to making the frame from bars formed in the old way, and greatly increase its strength and durability.

A are the side bars of the frame, which are made of channel-iron, as shown in Fig. 2. The side bars A are bent at the corners of the frame, and extend inward at right angles to form the ends of the frame. The ends of the bars A meet at the center of the ends of the frame, and are secured in place by a short bar, *a'*, placed in the channel of the bars A, overlapping their joint, and is securely bolted or riveted to the body of the ends of the said bars, as shown in Fig. 1. B are the middle longitudinal bars, which are also made of channel-iron, placed with their channels toward the channels of the outer bars A. The longitudinal bars A and B upon each side of the frame are connected to each other and strengthened by the V-shaped braces C, each pair of which is bolted or riveted to each other at their middle parts, and their ends are placed in the channels of the bars A B and bolted or riveted to the body of the said bars A B. Three (more or less) pairs of braces, C, are used upon each side, according to the size of the frame. The ends of the bars B are connected with the bars A at the ends of the frame by the plates D, which plates D are securely bolted or riveted to the bars A and B, as shown in Figs. 1 and 3, said bolts or rivets passing through the flanges of the bars A B. The bars B are also connected to each other at different points of their length by the plates E and F, bolted or riveted to the upper or lower sides of the said bars. The plates D E F not only strengthen the frame, but also serve as supports for the attachments of the running-gear and body of the car.

Having thus described my invention, I wish it understood that although it is necessary to brace the frame thoroughly I do not make the number and kind of braces C D E F or their arrangement essential to the employment of the invention. Furthermore, I declare that I do not claim making a tender or car frame of iron bars formed from riveted plates; but

What I do claim as my invention, and desire to secure by Letters Patent, is—

The improved frame for railway carriages, consisting of the parallel longitudinal exterior and interior bars of channeled iron, united by end bars and braced laterally at right and oblique angles, substantially as and for the purposes specified.

BENJAMIN W. HEALEY.

Witnesses:

PETER F. HUGHES,

A. J. CUSHING.